United States Patent [19]

Murayama et al.

[11] Patent Number: 5,071,339
[45] Date of Patent: Dec. 10, 1991

[54] COMPRESSION MOLDING APPARATUS

[75] Inventors: Kashiwa Murayama, Fujisawa; Masakazu Tatsuta, Hiratsuka, both of Japan

[73] Assignee: Toyo Seikan Kaisha, Ltd., Tokyo, Japan

[21] Appl. No.: 429,383

[22] Filed: Oct. 31, 1989

[30] Foreign Application Priority Data

Nov. 7, 1988 [JP] Japan .................. 63-279495

[51] Int. Cl.⁵ .................. B29C 39/10; B29C 45/14
[52] U.S. Cl. .................. 425/116; 425/126.1; 425/127; 425/233; 425/236; 425/261; 425/361; 425/437; 425/577; 425/588; 425/809
[58] Field of Search .......... 425/468, 809, 110, 113, 425/114, 121, 414, 457, 525, 539, 540, 116, 117, 126.1, 127, 129.1, 572, 526, 588, 137, 236, 577, 261, 361, 437

[56] References Cited

U.S. PATENT DOCUMENTS

| 695,507 | 3/1902 | Strang | 249/57 |
|---|---|---|---|
| 1,262,385 | 4/1918 | Penza | 425/468 |
| 3,458,907 | 8/1969 | Shannon | 425/468 |
| 4,312,687 | 1/1982 | Sigworth, Jr. | 249/83 |
| 4,424,015 | 1/1984 | Black | 425/576 |

FOREIGN PATENT DOCUMENTS 57-178730 11/1982 Japan .
59-191532 10/1984 Japan .
59-191533 10/1984 Japan .

Primary Examiner—Jay H. Woo
Assistant Examiner—William J. Matney, Jr.
Attorney, Agent, or Firm—Beveridge, DeGrandi & Weilacher

[57] ABSTRACT

A compression molding apparatus includes a rotatable supporting member and circumferentially spaced molds mounted on the rotatable supporting member. The molds are conveyed successively through a plastic material feed zone, a compression molding zone and a discharge zone by the rotation of the rotatable supporting member. A plastic material in a heat softened state is fed into the molds which are disposed within the plastic material feed zone. Each of the molds include a first mold portion and a second mold portion which defines a mold cavity. The mold is opened and closed by moving the mold portions relative to each other in a predetermined direction. A conduit hole extending from the mold cavity is formed in the second mold portion. Each mold includes a compression rod which slides in the conduit hole. The conduit hole has a plastic receiving portion opened frontwardly in the rotating direction of the rotatable supporting member. The plastic material feeder includes an extruder which has an opening opposite to a passage for conveying the plastic. The extruder is constructed such that the heat softened plastic material extruded from the extrusion opening is received in the plastic receiving portion of the conduit hole and cut. The extrusion opening is elongated in the conveying direction of the plastic receiving portion and has a portion progressively wider downstream as viewed in the conveying direction.

5 Claims, 11 Drawing Sheets

FIG. 2-A
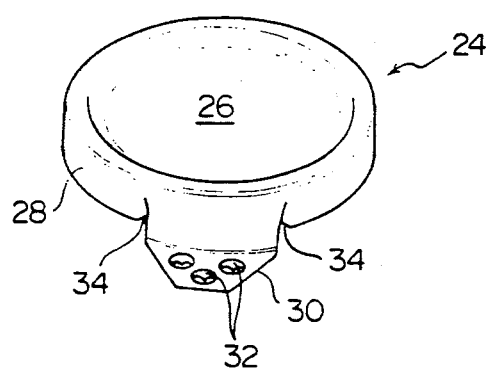
FIG. 3-A
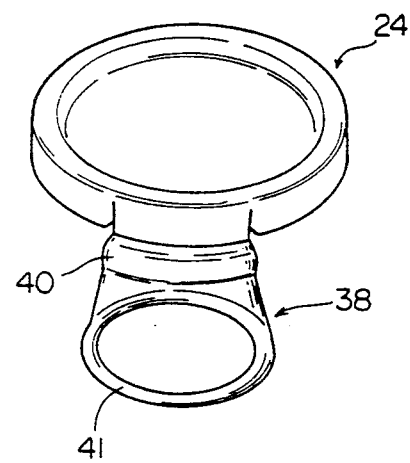
FIG. 2-B
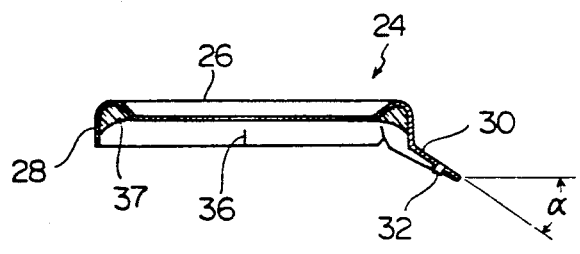
FIG. 3-B
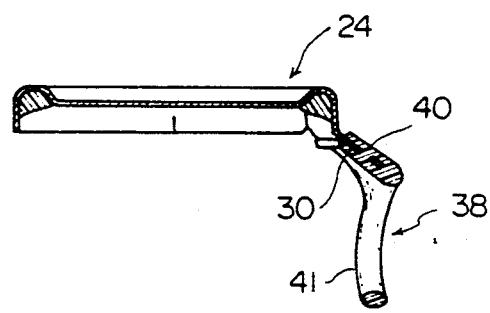

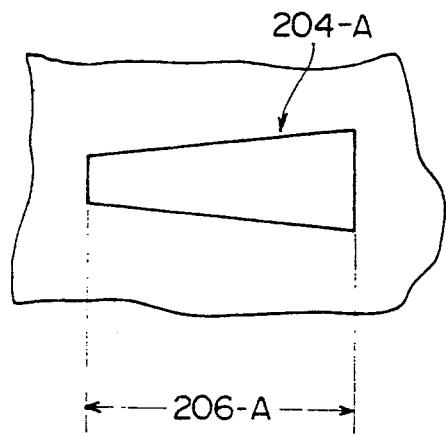
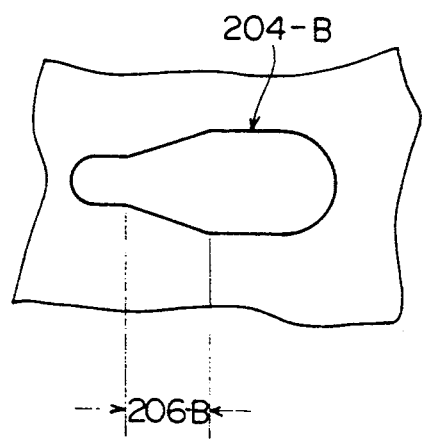
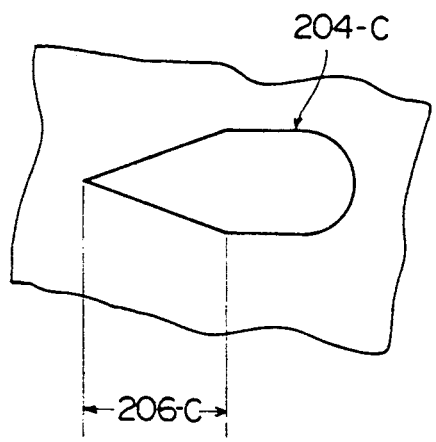
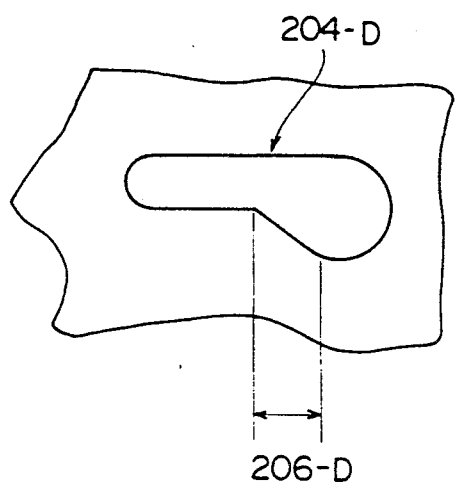
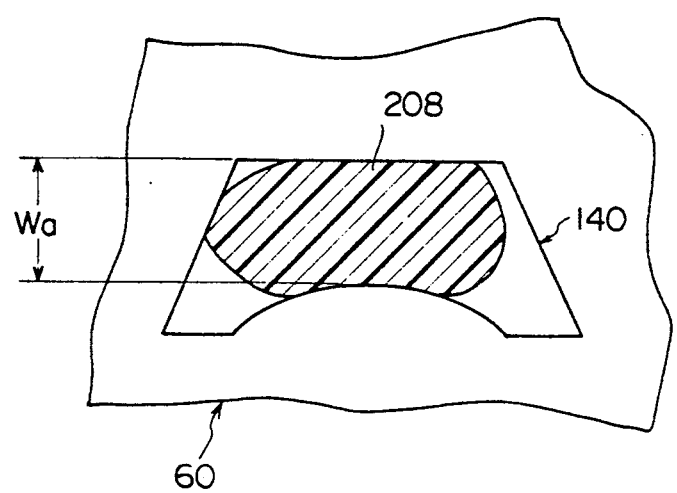

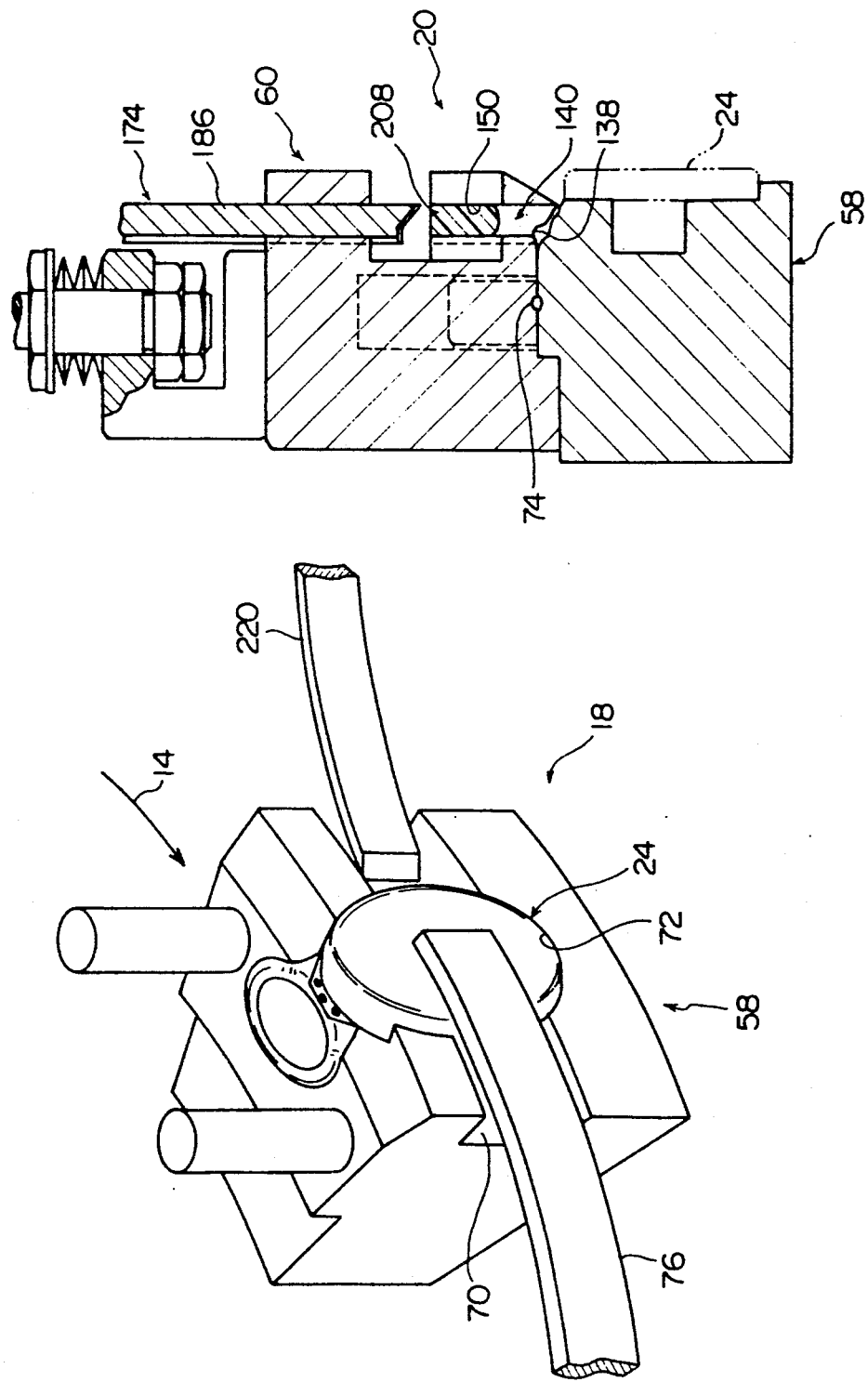

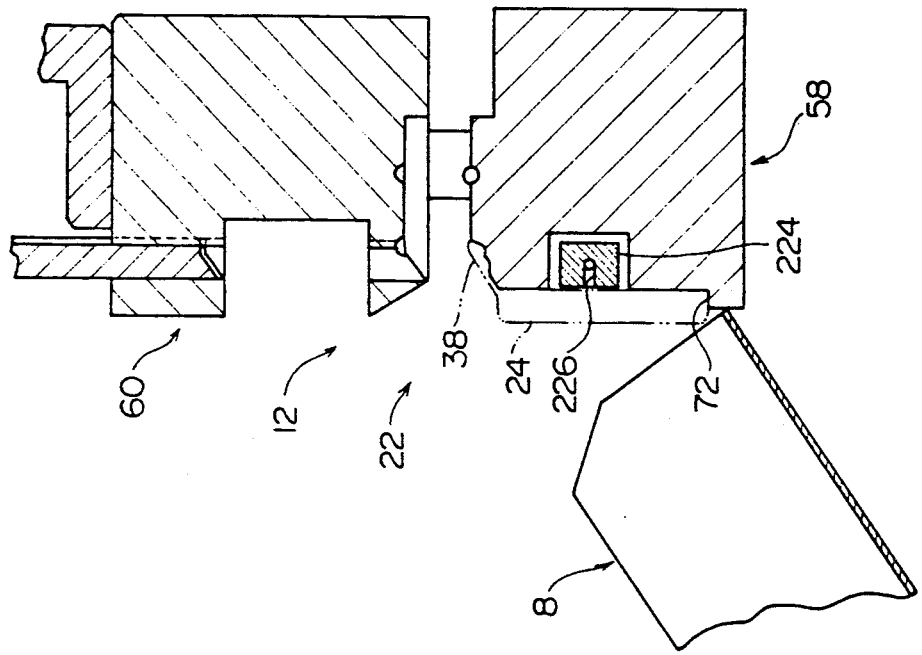
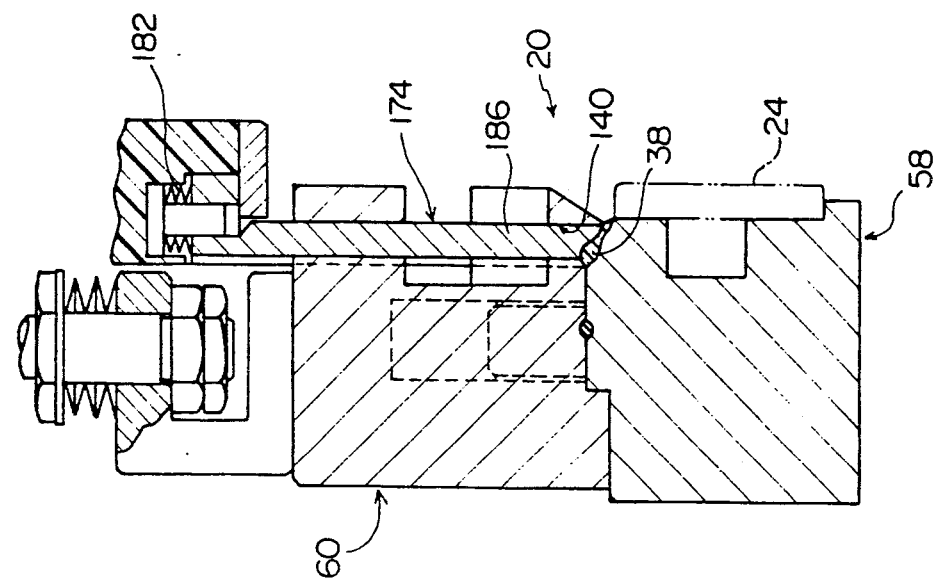

COMPRESSION MOLDING APPARATUS

FIELD OF THE INVENTION

This invention relates to a compression molding apparatus which can be conveniently used for forming a plastic grip ring and simultaneously linking it integrally to a linking protruding piece of a container closure body.

DESCRIPTION OF THE PRIOR ART

Japanese Laid-Open Patent Publication No. 178730/1982 discloses a container closure comprised of a metallic container closure body and a plastic grip ring as a suitable example of a simple openable container closure. The container closure body is shaped from a suitable thin metallic plate such as a thin plate of an aluminum-base alloy and has a circular top panel wall, a cylindrical skirt wall extending from the peripheral edge of the circular top panel wall, and a linking protruding piece protruding from part of the free end of the skirt wall. The grip ring is integrally linked to the free end portion of the linking protruding piece of the container closure body.

The present inventors previously proposed a compression molding apparatus for forming a plastic grip ring for the above container closure and simultaneously linking it to a linking protruding piece of the container closure body (to be referred to as the prior compression molding apparatus) in the specification and drawings of Japanese Patent Application No. 138212/1987 (entitled "COMPRESSION MOLDING APPARATUS"). The prior compression molding apparatus includes a rotatably mounted rotatable supporting member and a plurality of circumferentially spaced molds mounted on the rotatable supporting member. Each of the molds is conveyed successively through a plastic material feed zone, a container closure feed zone, a compression molding zone and a discharge zone. A plastic material feed means for feeding a plastic material to the molds is disposed in the plastic material feed zone, and a container closure body feed means for feeding container closure bodies to the molds is disposed in the container closure feed zone.

Each of the molds in the prior compression molding apparatus comprises a first mold portion and a second mold portion which are opened and closed by being moved relative to each other. The first and second mold portions in cooperation with each other define a mold cavity. The second mold portion has formed therein a conduit hole extending from the mold cavity, and a compression rod is slidably inserted into the conduit hole. A plastic receiving portion being opened frontwardly the rotating direction of the rotatably supporting member is formed in the conduit hole. On the other hand, the plastic material feed means consists of an extruder having an extrusion opening facing a conveying passage for the plastic receiving portion of the conduit hole. The heat-softened plastic material extruded from the extrusion opening, by the rotation of the rotatable member, is received in the plastic receiving portion of the conduit hole, cut and fed to the mold.

The experience of the present inventors tells that the prior compression molding apparatus has the following problems still to be solved.

It is important that the heat-softened plastic material extruded from the extrusion opening of the extruder should be received in the plastic receiving portion of the conduit hole without bulging out of it, and should be conveyed with the mold to the molding zone without coming out of the plastic receiving portion of the conduit hole. In the prior compression molding apparatus, this requirement cannot be met accurately and stably. In order for the heat-softened plastic material to be accurately received in the plastic receiving portion of the conduit hole, one may attempt to make the cross-sectional area of the extrusion opening from which the plastic material is extruded smaller than the cross-sectional area of the conduit hole. This, however, frequently results in a tendency of the plastic material received in the plastic receiving portion to drop from it without being accurately held in it. If, on the other hand, the cross-sectional area of the extrusion opening is made larger than the cross-sectional area of the conduit hole, the dropping of the plastic material from the conduit hole can be prevented. However, the plastic material cannot advance into the plastic receiving portion and partly tends to bulge out of the plastic receiving portion.

SUMMARY OF THE INVENTION

It is a main object of this invention to solve the above problem in the prior compression molding apparatus or a similar compression molding apparatus, and to improve the apparatus such that the heat-softened plastic material extruded from the extrusion opening of the extruder is received accurately in the plastic receiving portion of the conduit hole without bulging out of it and is conveyed with the mold to the molding zone accurately without dropping off from the plastic receiving portion of the conduit hole.

Extensive investigations of the present inventors have now led to the discovery that the above object can be achieved by shaping the extrusion opening of the extruder (and therefore, the cross section of the heat-softened plastic material extruded from the extrusion opening) such that it is elongated in the conveying direction of the plastic receiving portion of the conduit hole (and therefore, the rotating direction of the rotatable supporting member), and has a portion progressively becoming larger in width downstream as viewed in the conveying direction.

According to this invention, there is provided a compression molding apparatus comprising a rotatably mounted rotatably supporting member and a plurality of circumferentially spaced molds mounted on the rotatable supporting member, each of said molds being adapted to be conveyed successively through a plastic material feed zone, a compression molding zone and a discharge zone by the rotation of the rotatable supporting member, and a plastic material feed means for feeding a plastic material in the heat-softened state to each of said molds being disposed in the plastic material feed zone; wherein each of said molds comprises a first mold portion and a second mold portion adapted to be opened and closed by being moved relatively to each other in a predetermined direction, the first mold portion and the second mold portion, in cooperation with each other, define a mold cavity, a conduit hole extending from the mold cavity is formed in the second mold portion, each of the molds comprises a compression rod inserted slidably in the conduit hole, and the conduit hole has a plastic receiving portion opened frontwardly in the rotating direction of the rotatable supporting member, and the plastic material feed means consists of an extruder having an extrusion opening opposite to a passage for conveying the plastic receiving portion of the conduit hole by the rotation of the rotatable supporting member and is constructed such that the heat-softened plastic material extruded from the extrusion opening is received in the plastic receiving portion of the conduit hole conveyed by the rotation of the rotatably supporting member and cut and the extrusion opening of the extruder is elongated in the conveying direction of the plastic receiving portion in the conduit hole and has a portion progressively wider downstream as viewed in the conveying direction.

Preferably, the conduit hole has a minimum width in its intermediate part in its conveying direction, and the minimum width is prescribed at a value larger than the width of the upstream end in the conveying direction of that portion of the plastic material extruded from the extrusion opening which corresponds to the progressively wider portion of the extrusion opening but smaller than the width of the downstream end in the conveying direction of said portion of the plastic material extruded from the extrusion opening.

BRIEF DESCRIPTION OF THE DRAWINGS

FIGS. 2-A and 2-B respectively show a perspective and a sectional view showing a container closure body.

FIGS. 3-A and 3-B respectively show a perspective and a sectional view showing a container closure having a closure body and a compression-molded grip ring.

FIGS. 13-A, 13-B, 13-C and 13-D are partial bottom views showing modified examples of the extrusion opening.

FIG. 14 is a partial sectional view showing a plastic material as received in a plastic receiving portion of a conduit hole in the mold shown in FIG. 5.

FIG. 15 is a partial perspective view showing a container closure body feed zone in the compression molding apparatus shown in FIG. 1.

FIGS. 16 and 17 are partical sectional views respectively showing the upstream and downstream portion of a compression molding zone in the compression molding apparatus shown in FIG. 1.

FIGS. 18 and 19 are a partial sectional view and a partial perspective view showing a discharge zone in the compression molding apparatus shown in FIG. 1.

DETAILED DESCRIPTION OF THE PREFERRED EMBODIMENTS

With reference to the accompanying drawings, preferred embodiments of the compression molding apparatus of this invention will be described in detail.

OUTLINE OF THE APPARATUS IN ITS ENTIRETY

Figure 1:
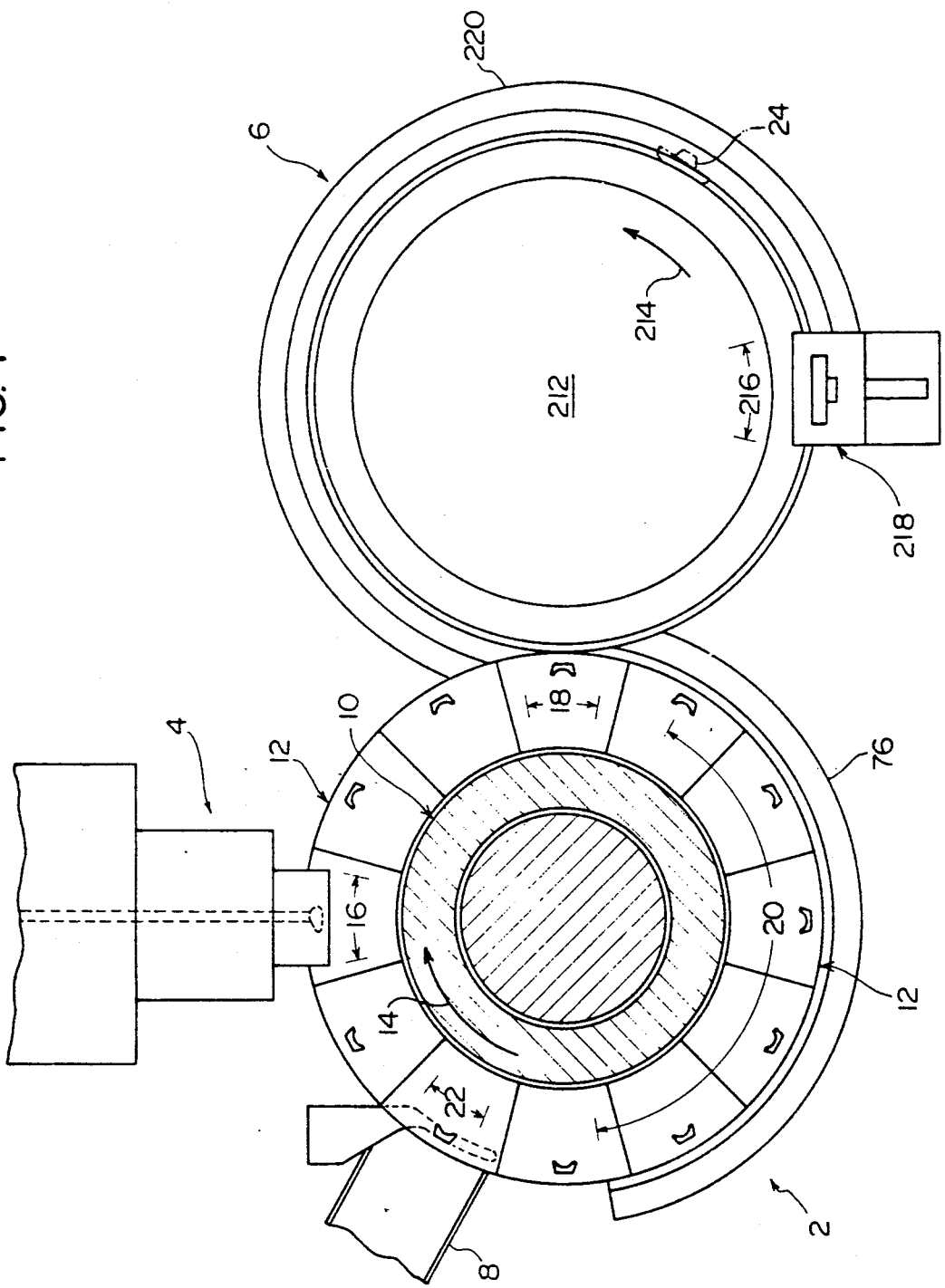
FIG. 1 is a simplified horizontal sectional view showing the compression molding apparatus of this invention as a whole.

With reference to FIG. 1 showing the compression molding apparatus in its entirety in a simplified manner, the illustrated compression molding apparatus comprises a main body shown generally at 2, a plastic material feed means 4 consisting of an extruder, a container closure body feed means 6 in the form of a rotating turret, and a discharge chute 8. The main body 2 of the compression molding apparatus to be described in detail hereinbelow includes a rotatable supporting member 10 mounted for free rotation about a central axis extending vertically with respect to the sheet surface in FIG. 1, a plurality of (12 in the drawing) molds 12 disposed on the rotatable supporting member 10 in a circumferentially spaced-apart relationship. The rotatable supporting member 10 is continuously rotated in the direction shown by an arrow 14 in FIG. 1, and thus, each of the molds 12 is conveyed successively through a plastic material feed zone 16, a container closure body feed zone 18, a compression molding zone 20 and a discharge zone 22. In the plastic material feed zone 16, a plastic material is fed into each of the molds 12 by the plastic material feed means 4. In the container closure body feed zone 18, a container closure body is fed into each of the molds 12 by the container closure body feed means 6. In the compression molding zone 20, the plastic material is molded into a grip ring and the grip ring is simultaneously linked integrally to the container closure body. The container closure having the grip ring is discharged from each of the molds 12 into the discharge chute 8 in the discharge zone 22.

Container Closure

FIGS. 2-A and 2-B show one example of a container closure body 24 of a known type to be fed into each of the molds 12 of the main body 2 of the compression molding apparatus from the container closure body feed means 6. A container closure 24 which may be formed of a suitable thin metallic plate such as a thin plate of an aluminum-base alloy, a thin plate of a chromate-treated steel or a tin plate has a circular top panel 26, a cylindrical skirt wall 28 extending downwardly from the periphery of the top panel 26, and a linking protruding piece 30 protruding from part of the free end of the skirt wall 28. The linking protruding piece 30 may protrude from part of the free end of the skirt wall 28 in an axial direction, or in a substantially horizontally radial direction. Conveniently, as shown, it protrudes radially outwardly in a downwardly inclined direction with an inclination angle α of about 15 to 60 degrees. Preferably, one or more (three in the illustrated embodiments) openings 32 are formed in the free end portion of the linking protruding piece 30 in order to increase the linking strength of the grip ring to be described. In the container closure body 24, a nearly triangular cut 34 is formed in the skirt wall 28 on both sides of the base end of the linking protruding piece 30. At each of site angularly spaced in both directions by about 90 degrees from the center of the linking protruding piece 30 in the circumferential direction, a breakable line 36 (FIG. 2-B) extending upwardly from the free end of the skirt wall 28 is formed. The breakable line 36 may be a so-called score. The peripheral edge portion of the top panel 26 protrudes upwardly, and a plastic annular liner 37 is applied to the inside surface of the protruding peripheral edge portion.

FIGS. 3-A and 3-B show a container closure having the plastic grip ring 38 molded in the main body 2 of the compression molding apparatus. The grip ring 38 may be molded from a suitable plastic material such as polyethylene or polypropylene, and has a base portion 40 and a ring-shaped portion 41 extending downwardly from the base portion 40. The base portion 40 of the grip ring 38 surrounds at least the free end portion of the linking protruding piece 30 and integrally linked to it.

Main Body of a Rotatable Compression Molding Apparatus

Figure 4:
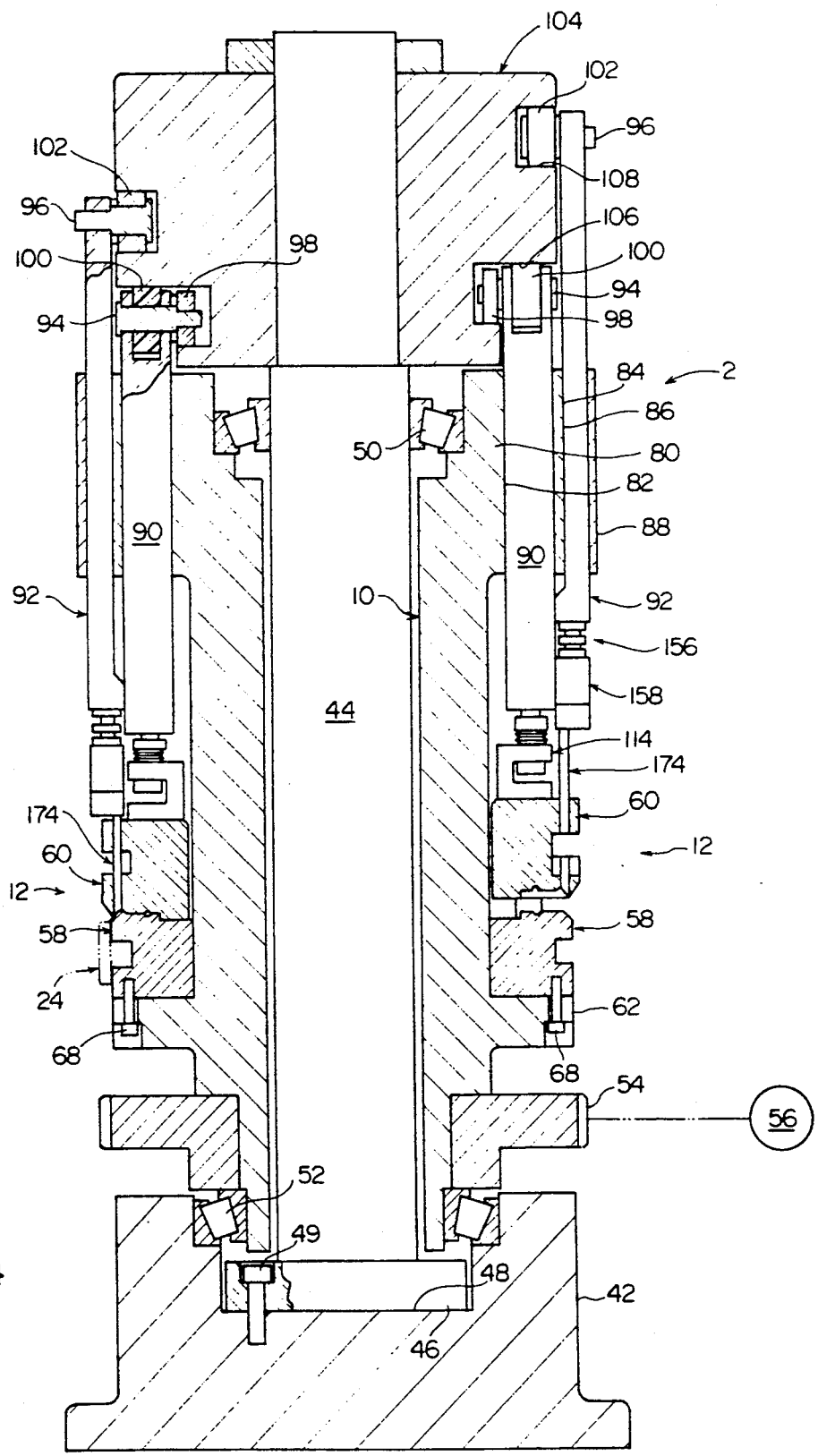
FIG. 4 is a vertical sectional view showing the main body of a rotatable compression molding apparatus in the compression molding apparatus shown in FIG. 1.

With reference to FIG. 4, the main body 2 of the rotatable compression molding apparatus includes a supporting structure comprised of a nearly disc-shaped stationary supporting block 42 and a substantially vertically extending stationary supporting shaft 44. An annular flange 46 is formed in the lower end portion of the supporting shaft 44. The flange 46 is inserted into a depression 48 formed in the upper surface of the supporting block 42 and fixed to the supporting block 42 by a bolt 49. The nearly cylindrical rotatable supporting member 10 surrounding the supporting shaft 44 is mounted on the supporting structure comprised of the supporting block 42 and the supporting shaft 44 fixed to it by an upper bearing 50 and a lower bearing 52. An input gear 54 is fixed to the lower end portion of the rotatable supporting member 10, and drivingly connected to a driving source 56 which may be an electric motor via a suitable transmission mechanism (not shown). Thus, when the driving source 56 is energized, the rotatable supporting member 10 is rotated continuously at a predetermined velocity in the direction of arrow 14 in FIG. 1.

The molds 12 (twelve molds in FIG. 1) which are circumferentially spaced from each other at equal intervals are mounted on the rotatable supporting member 10. Each of the molds 12 includes a first mold portion 58 and a second mold portion 60. An annular supporting flange 62 is formed in the lower part of the rotatable supporting member 10, and the first mold portion 58 of each of the molds 12 is fixed to the upper surface of the annular supporting flange 62. As can be seen from FIGS. 5 and 6, the first mold portion 58 is nearly fan-shaped, and as shown in FIG. 4, by threadedly fixing a clamping bolt 68 to the under surface of the first mold portion 58 through the annular supporting flange 62 of the rotatable supporting member 10, the first mold portion 58 is fixed to the supporting flange 62.

Figure 5:
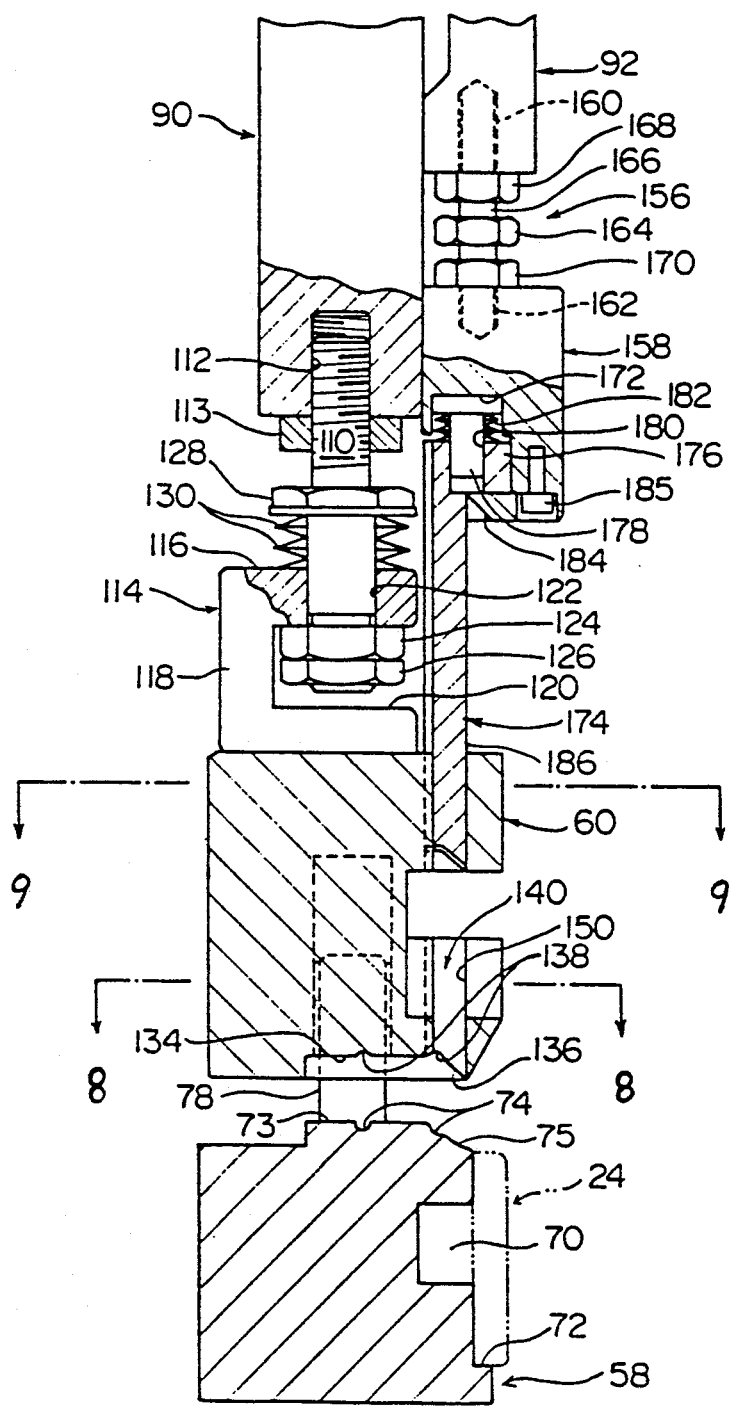
FIG. 5 is a partial sectional view showing a mold in the compression molding apparatus shown in FIG. 4 and its related constituent elements.
Figure 6:
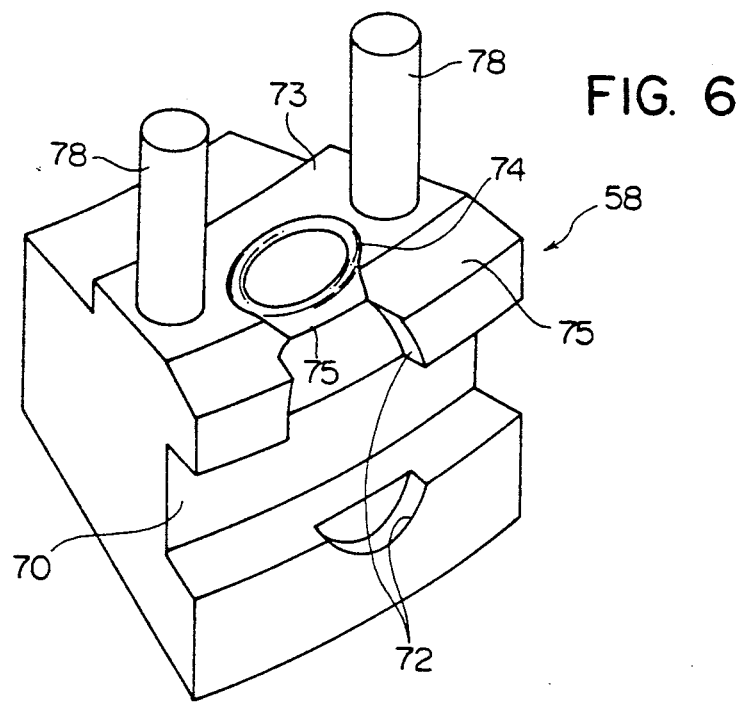
FIG. 6 is a perspective view showing a first mold portion of the mold shown in FIG. 5.

As shown in FIG. 6, a relatively deep groove 70 extending substantially horizontally and arcuately is formed on the peripheral surface of the first mold portion 58 (the function of the groove 70 will be described hereinafter). A circular depression 72 having a diameter corresponding to the outside diameter of the skirt wall 28 of the closure body 24 is formed on the peripheral surface of the first molding portion 58. On the upper surface of the first mold portion 58 are present a substantially horizontally extending main portion 73 and an inclined portion 75 inclined slightly downwardly from the main portion 73 in a radially outward direction. A first molding depressed portion 74 extending in a ring shape from the inclined portion 75 toward the main portion 73 is formed on the upper surface of the first mold portion 58 corresponding to the above circular depression formed on the peripheral surface of the first mold portion 58. Furthermore, some depressions 75 having a predetermined width are also formed on the upper surface of the first mold portion 58 to connect the front edge of the upper surface to the first molding depressed portion 74. As will be further described hereinafter, the container closure body 24 fed into the molds 12 from the container closure body feed means 6 is received in the first mold portion 58 in the state shown by a two-dot chain line in FIG. 5. Specifically, the free end portion of the skirt wall 28 of the container closure body 24 is received in the circular depression 72, and the linking protruding piece 30 of the container closure body 24 projects into the first molding depressed portion 74 through the depressions 75. Hence, the circular depression 72 formed in the peripheral surface of the first mold portion 58 defines a space for accommodating the container closure body. The radially outward movement of the container closure body 24 is prevented by a stationary guide 76 (FIG. 1) extending arcuately adjacent to the peripheral surface of the first mold portion 58. (The stationary guide 76, particularly its upstream end portion and downstream end portions, will be described further hereinafter.) A pair of short rods 78 projecting upwardly substantially vertically on both sides of the first molding depressed portion 74 in the circumferential direction are provided in the first mold portion 58.

With reference to FIG. 4, a relatively thick supporting flange 80 is formed in the upper part of the rotatable supporting member 10. A plurality of (12 in the drawings) substantially vertically extending grooves 82 are formed in the supporting flange 80 at circumferentially equidistant positions. Each of the grooves 82 is positioned substantially in vertical alignment with each of the first mold portion 58. Each of the grooves 82 has a rectangular sectional shape and its outside surface is open. Plate-like members 84 are fixed to the peripheral surface of the supporting flange 80 in correspondence to the grooves 82. The plate-like members 84 respectively close the outside surfaces of the grooves 82. A substantially vertically extending groove 86 is formed on the outside surface of each of the plate-like members 84. The groove 86 also has a rectangular sectional shape and its outside surface is open. A plate-like member 88 closing the outside surface of the groove 86 is further fixed to the outside surface of the plate-like member 84. The grooves 82 are in alignment with the grooves 86 in the radial direction. A main elevator member 90 is received in each groove 82 for free elevation and lowering, and a subsidiary elevator member 92 is likewise received in each groove 86 for free elevation and lowering. Each of the main elevator member 90 and the subsidiary elevator member 92 extends upwardly beyond the supporting flange 80, and to its upper end portion is fixed a substantially horizontally extending shaft 94 or 96. Rollers 98 and 100 are rotatably mounted on the shaft 94, and a roller 102 is rotatably mounted on the shaft 96. The rollers 98, 100 and 102 constitute a cam follower. On the other hand, a nearly cylindrical cam block 104 is fixed to the upper end portion of the stationary supporting shaft 44, and cam grooves 106 and 108 are formed on the peripheral surface of the cam block 104. The rollers 98 and 100 disposed in the main elevator member 90 undergo the actions of the under surface and upper surface respectively of the cam groove 106, and the roller 102 disposed in the subsidiary elevator member 92, the actions of the upper surface and the lower surface of the cam groove 108. When the rotatable supporting member 10 is rotated in the direction of arrow 14 in FIG. 1, the main elevator member 90 and the subsidiary elevator means 92 are elevated or lowered.

Further with reference to FIGS. 4 and 5, a downwardly extending shaft 110 is fixed to the lower end of the main elevator member 90. An internally threaded hole 112 is formed in the main elevator member 90 extending upwardly from the lower end of the main elevator member 90, whereas an external thread is formed in the upper part of the downwardly extending shaft 110. The downwardly extending shaft 110 is fixed to the main elevator member 90 by fitting the external thread of the downwardly extending shaft 110 in the internally threaded hole 112 and applying a nut 113 for preventing unscrewing to the external thread of the downwardly extending shaft 110. A linking member 114 is mounted on the lower part of the downwardly extending shaft 110. The linking member 114 has a horizontal upper wall portion 116, a vertical wall portion 118 and a horizontal lower wall portion 120. A vertically extending through-hole 122 is formed in the horizontal upper wall portion 116 and the lower part of the downwardly extending shaft 110 is slidably inserted into the through-hole 122. An external thread is formed in the lower end part of the downwardly extending shaft 110. By applying nuts 124 and 126 to the external thread, the linking member 114 is prevented from coming out of the downwardly extending shaft 110. A bulged flange 128 is integrally formed in the intermediate portion, in the vertical direction of the downwardly extending shaft 110, and a plurality of plate springs 130 are disposed between the flange 128 and the upper surface of the horizontal upper wall portion 116 of the linking member 114. These plate springs 130 elastically bias the linking member 114 downwardly and elastically hold it at the illustrated position at which the under surface of the horizontal upper wall portion 116 makes contact with the nut 124.

The second mold portion 60 is fixed to the under surface of the horizontal lower wall portion 120 of the linking member 114 by causing a clamping bolt (not shown) through the horizontal lower wall portion 120 of the linking member 114 and fitting it into a downwardly extending internally threaded hole 132 (FIG. 9) from upper surface of the second mold portion 60.

Figure 7:
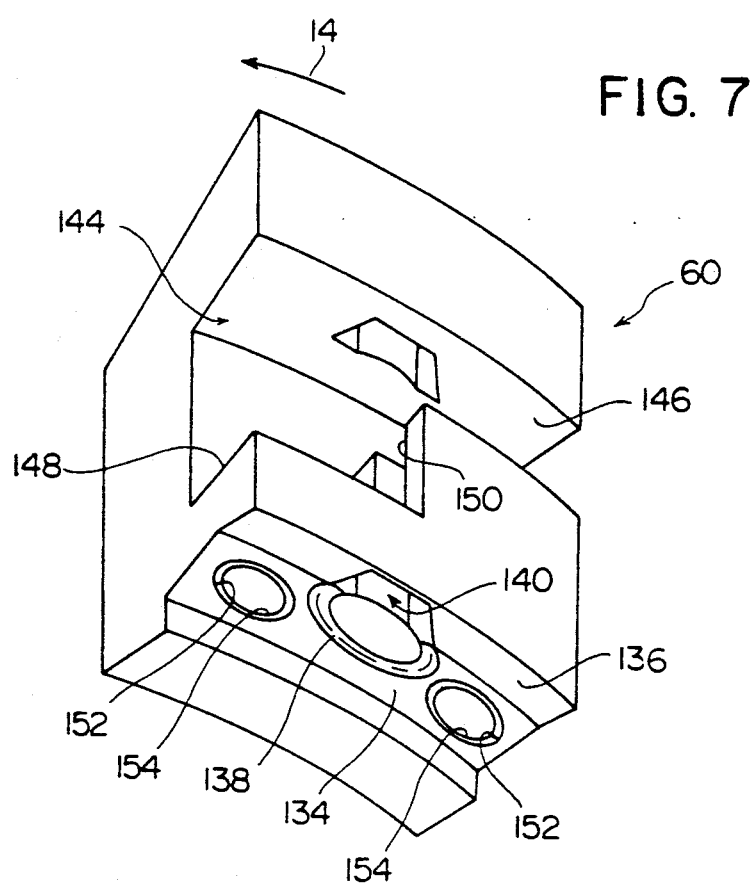
FIG. 7 is a perspective view showing a second mold portion of the mold shown in FIG. 5.
Figure 8:
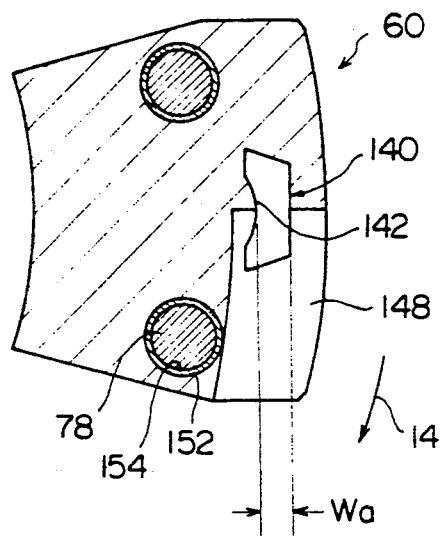
FIG. 8 is a sectional view taken on line 8—8 of FIG. 5.
Figure 9:
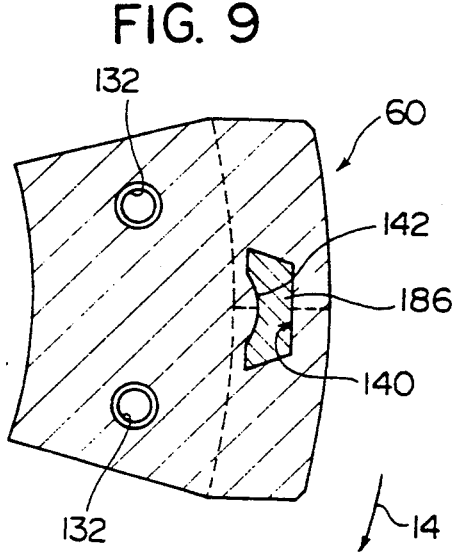
FIG. 9 is a sectional view taken on line 9—9 of FIG. 5.

With reference to FIGS. 7 to 9 in conjunction with FIG. 5, the second mold portion 60 is nearly fan-shaped as is the first mold portion 58. A substantially horizontally extending main portion 134 and an inclined portion 136 inclined slightly downwardly from the main portion 134 in the radially outward direction are present in the under surface of the second mold portion 60. The main portion 134 and the inclined portion 136 correspond respectively to the main portion 73 and the inclined portion 75 in the upper surface of the first mold portion 58. A second molding depressed portion 138 extending in a ring shape is formed in the under surface of the second mold portion 60. When the second mold portion 60 lowered in the manner to be described and its under surface makes close contact with the upper surface of the first mold portion 58, the second molding depressed portion 138 formed in the second mold portion 60 cooperates with the first molding depressed portion 74 formed in the first mold portion 58 to define a mold cavity. The linking protruding piece 30 of the closure body fed to the first mold portion 58 projects in the mold cavity radially from outside. Conveniently, the linking protruding piece 30 of the container closure body 24 projects into the intermediate part in the vertical direction of the mold cavity; or in other words, spaces are left both on the upper and lower sides of the linking projecting piece 30 in the mold cavity for the incoming of the plastic material. A conduit hole 140 extending upwardly substantially vertically from the outside part in the radial direction of the second molding depressed portion 138 is formed in the second mold portion 60. As shown clearly in FIGS. 8 and 9, the conduit hole 140 is nearly trapezoidal in cross section, and an arcuate raised portion 142 is present centrally in its radially inward side (the bottom of the trapezoid). Hence, the conduit hole 140 has a minimum width part having the smallest width (Wa) in the intermediate part as viewed in the conveying direction shown by arrow 14, of the second mold portion 60. As clearly shown in FIG. 7, a relatively large cut 144 is formed in the peripheral surface of the second mold portion 60. The cut 144 is nearly L-shaped on the whole, and has an entire circumferential cut portion 146 extending along the entire peripheral surface of the second mold portion 60 circumferentially and a half circumferential cut portion 148 existing only in a front half of the peripheral surface of the second mold portion 60 in the conveying direction below the entire circumferential cut portion 146. The entire circumferential cut portion 146 leaves the entire circumference of the conduit hole 140 open, and the half circumferential cut portion 148 leaves the front half of the conduit hole 140 open in the conveying direction. That part of the conduit hole 140 at which its front side portion in the conveying direction is left open by the half circumferential cut portion 148 constitutes a plastic material receiving portion 150 for receiving a heat-softened plastic material in the manner to be described in detail. As seen from FIGS. 5 taken together with FIGS. 7 and 8, a pair of holes 152 extending upwardly substantially vertically from the main portion 134 of the under surface of the second mold portion 60 are formed on both sides in the circumferential direction of the second molding depressed portion 138 in the under surface of the second mold portion 60. A metallic bush 154 is forced into each of the holes 152. As shown in FIG. 5, the pair of short rods 78 provided in the first mold portion 58 are inserted into these bushes 154. As a result, the first mold portion 58 and the second mold portion 60 cooperating with each other are positioned relative to each other.

With reference to FIGS. 4 and 5, a downwardly extending member 158 is linked to the lower end of the subsidiary elevator member 92 via an adjusting mechanism 156. The subsidiary elevator member 92 has formed therein an internally threaded hole 160 extending upwardly from its under surface, and the downwardly extending member 158 has formed therein an internally threaded hole 162 extending downwardly from its under surface. A right thread is formed in the internally threaded hole 160, and a left thread, in the internally thread hole 162. A shaft member 166 having a hexagonal flange portion 164 integrally formed in its vertically intermediate portion has formed a right external thread in its upper half portion and a left external thread in its lower half portion. The upper half protion of the shaft member 166 is threadedly fitted in the internally threaded hole 160 of the subsidiary elevator member 92 and clamped by a nut 168, and its lower half portion is fitted threadedly in the internally threaded hole 162 of the downwardly extending member 158 and clamped by a nut 170. When the nuts 168 and 170 are loosened and the shaft member 166 is turned in the right thread direction, the downwardly extending member 158 (and therefore, a compression rod 174 described hereinafter) is elevated against the subsidiary elevator member 92. If the shaft member 166 is turned in the left thread direction, the downwardly extending member 158 (and therefore, a compression rod 174 described hereinafter) is lowered against the subsidiary elevator member 92. A cut 172 opened downwardly is formed in the radially inside lower portion of the downwardly extending member 158, and an enlarged head portion 176 of a compression rod 174 is accommodated in the cut 172. A guide pin 178 having a substantially vertically and downwardly extending shaft portion is fixed to the inside of the cut 172. On the other hand, a guide hole 180 extending vertically is formed in the enlarged head portion 176 of the compression rod 174, and the shaft portion of the guide pin 178 is slidably inserted through the guide hole 180. A plurality of plate springs 182 are disposed around the shaft portion of the guide pin 178. These plate springs 182 elastically bias the compression rod 174 downwardly. A stop plate 184 positioned below the enlarged head portion 176 of the compression rod 174 is fixed to the under surface of the downwardly extending member 158 by means of a bolt 185. When the stop plate 184 makes contact with the under surface of the enlarged head portion 176 of the compression rod 174, the lowering of the compression rod 174 is restricted. The compression rod 174 has a main rod portion 186 extending downwardly beyond the stop plate 184. The main rod portion 186 is inserted through the conduit hole 140. As shown in FIG. 9, the main rod portion 186 has a cross-sectional shape substantially identical with that of the conduit hole 140.

Plastic Material Feed Zone

Figure 10:
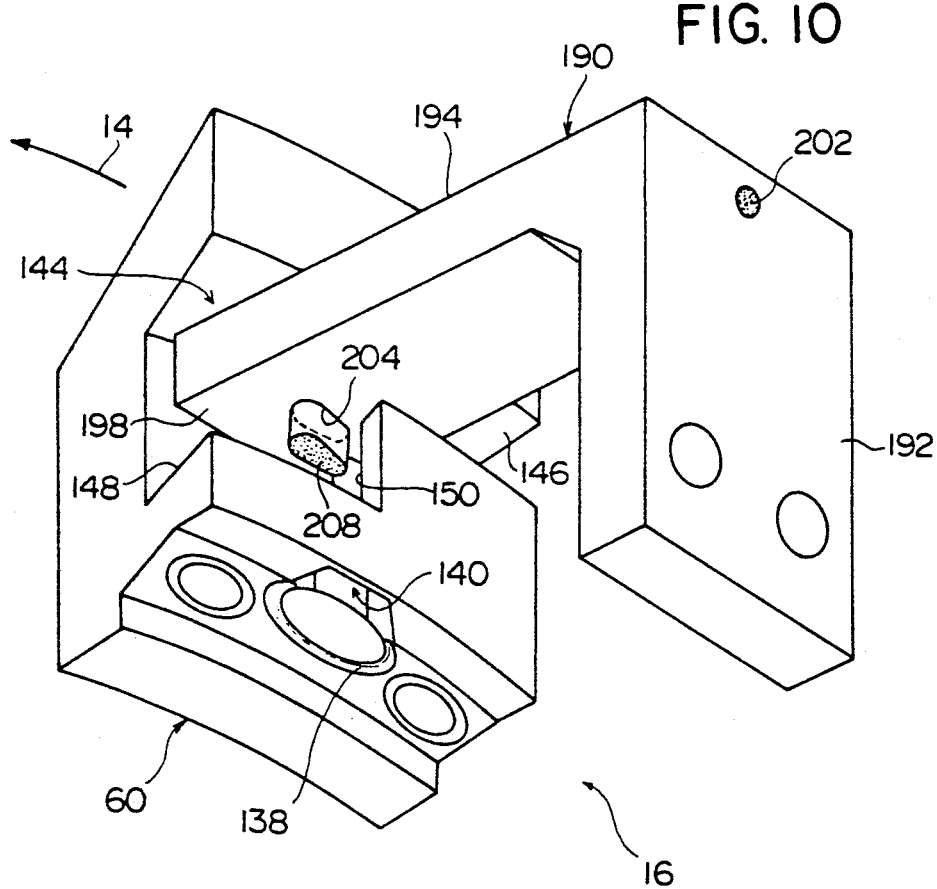
FIGS. 10 and 11 are respectively a partial perspective view and a partial sectional view showing a plastic material feed zone in the compression molding apparatus shown in FIG. 1.
Figure 11:
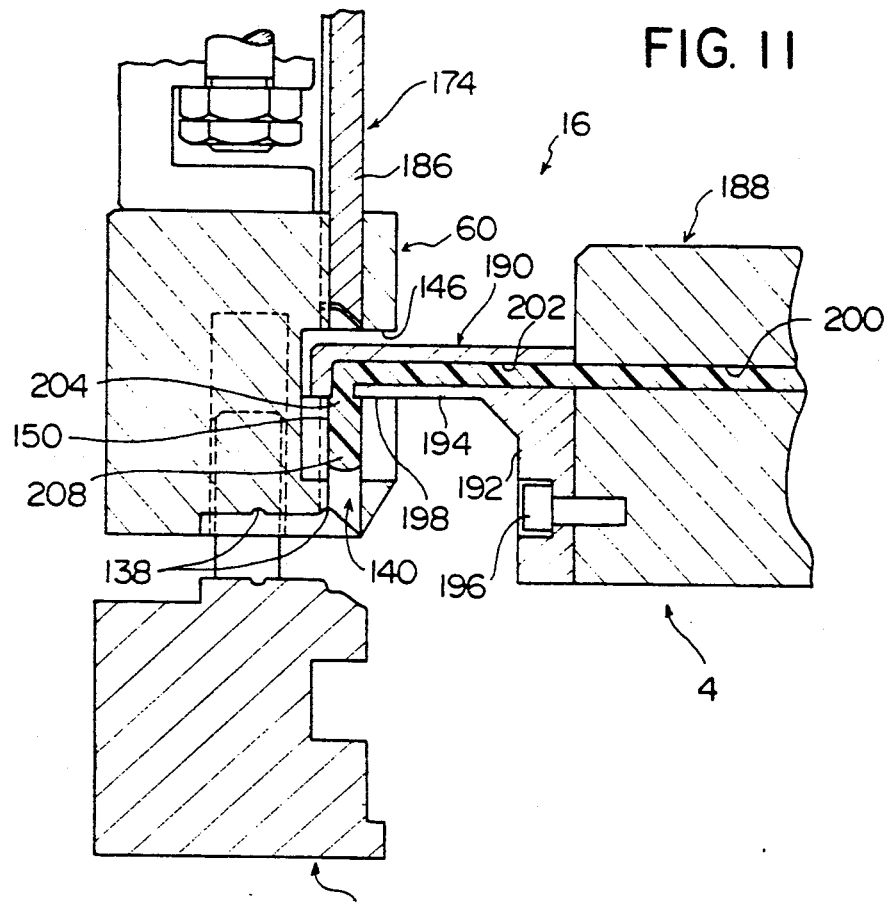
Figure 12:
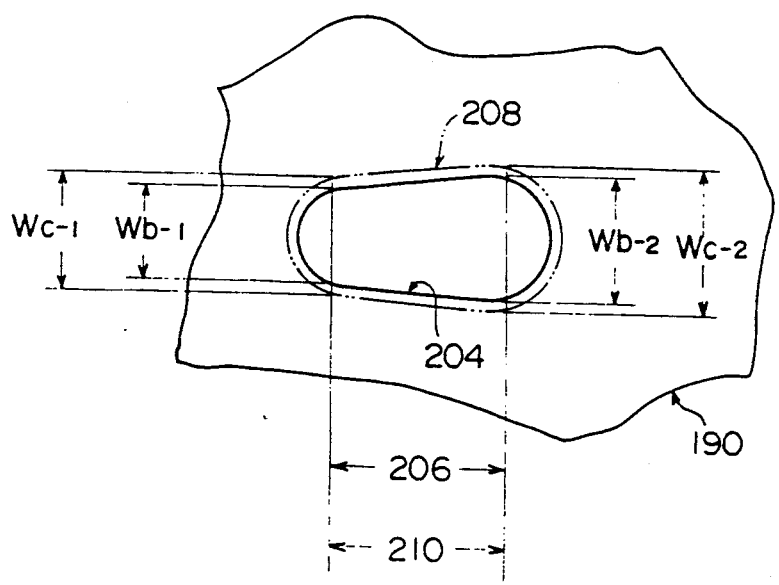
FIG. 12 is a partial bottom view of the extrusion opening of an extruder disposed in the plastic material feed zone shown in FIGS. 10 and 11.

With reference to FIGS. 10 and 11 in conjunction with FIG. 1, the plastic material Feed means 4 disposed in relation to the plastic material feed zone 16 includes an extruder 188 and an extrusion block 190 fixed to one end of the extruder 188. The extrusion block 190 has a substantially vertically extending base portion 192 and a projecting portion 194 substantially horizontally extending from the upper end of the base portion 192. A clamping bolt 196 is threadedly fitted on the end surface of the extruder 188 through the lower part of the base portion 192 to fix the extrusion block 190 to the end of the extruder 188. The projecting portion 194 of the extrusion block 190 has an under surface 198 extending substantially horizontally. An extrusion passage 202 is formed in the extrusion block 192 which extends within the projecting portion 194 from its inlet end connected to the downstream end of an extrusion passage 200 formed in the extruder 188. The extrusion passage 202 extends within the projecting end portion 194 substantially horizontally from the inlet end to the end portion of the projecting portion 194, then extends downwardly to an under surface 198, and is open to the under surface 198. An extrusion opening 204 of the extrusion passage 202 open to the under surface 198 should have a progressively wider portion which is elongated in the conveying direction shown by arrow 14 of the second mold portion 60, and is progressively wider downstream as viewed in the conveying direction. As clearly shown in FIG. 12, the extrusion opening 204 in the illustrated embodiment is in the shape of a cocoon which is elongated in the conveying direction and its upstream and downstream end portions in the conveying direction are both semicircular. Its main portion between these ends has a progressively increasing width downwardly as viewed in the conveying direction from Wb-1 to Wb-2 and thus defines a progressively wider portion 206. A plastic material 208 (which may be a thermoplastic synthetic resin such as polyethylene or polypropylene) in the heat-molten state is advanced through the extrusion passage 202 of the extrusion block 192 and extruded downwardly from the extrusion opening 204. As is known to those skilled in the art, the plastic material 208 is slightly expanded upon extrusion from the extrusion opening 204. Hence, as shown by a two-dot chain line in FIG. 12, the cross-sectional shape of the extruded plastic material 208 is substantially symmetrical with, but larger than, the cross-sectional shape of the extrusion opening 204. Specifically, the cross-section of the extruded plastic material 208 is in the shape of a cocoon which is elongated in the conveying direction. Its upstream and downstream end portions in the conveying direction are semicircular. Its main portion between these ends defines a progressively wider portion 210 having a progressively increasing width downstream as viewed in the conveying direction from Wc-1, to Wc-2 (Wc-1 is slightly larger than Wb-1, and Wc-2 is slightly larger than Wb-2). Preferably, the minimum width (Wa) of the minimum width site in the intermediate portion in the conveying direction of the conduit hole 140 disposed in the second mold portion 60 is larger than width Wc-1 of the extruded plastic material 208 and smaller than its width Wc-2.

FIGS. 13-A to 13-D show modified examples of the extrusion opening. An extrusion opening 204-A shown in FIG. 13-A is trapezoidal and extends slender in the conveying direction. Its width is progressively increased from its upstream end to its downstream end in the conveying direction. The whole of the extrusion opening 204-A defines a progressively wider portion 206-A. An extrusion opening 204-B shown in FIG. 13-B is of such a shape that only a portion (about ¼ part) located at its upstream portion defines a progressively wider portion 206-B. In an extrusion opening 204-C shown in FIG. 13-C, its upstream half portion is triangular and defines a progressively wider portion 206-C. In an extrusion opening 204-D shown in FIG. 13-D, only a portion (about ¼ part) located at its downstream portion defines a progressively wider portion 206-D, and the progressively wider portion 206-D has a progressively increasing width only on one side in the conveying direction.

The operation in the plastic material feed zone 16 will be described. During passage through the plastic material feed zone 16, the constituent elements of the mold 12 are at the position shown in FIG. 11. Specifically, the second mold portion 60 mounted on the main elevator member 90 is at an elevated position away upwardly from the first mold portion 58, and the compression rod 174 mounted on the subsidiary elevator member 92 is elevated so that the lower end of its main rod portion 186 is positioned above the plastic receiving portion 150 of the conduit hole 140 formed in the second mold portion 60. As can be seen by reference to FIGS. 10 and 11, the projecting portion 194 of the extrusion block 190 in the plastic material feed means 4 projects in the entire circumferential cut portion 146 formed in the peripheral surface of the second mold portion 60, and the under surface 198 having the extrusion opening 204 formed therein is positioned in contact or proximity with the upper surface of the plastic receiving portion 150 of the conduit hole 140. When the plastic receiving portion 150 of the conduit hole 140 moves in the direction of arrow 14 by the rotation of the rotatable supporting member 10, the plastic material 208 extruded downwardly from the extrusion opening 204 of the extrusion block 190 is guided to the inside of the plastic receiving portion 150 through the open front side half in the conveying direction of the plastic receiving portion 150. When the plastic receiving portion 150 is further moved in the direction of arrow 14, the plastic material 208 received in the plastic receiving portion 150 is cut by the cutting action of the under surface 198 of the projecting portion 194 of the extrusion block 190 and the upper surface of the plastic receiving portion 150 acting in cooperation with each other. As a result, the plastic material 208 so cut is fed into the plastic receiving portion 150 and moved together with it.

The plastic material 208 extruded from the extrusion opening 204 has an elongated cross-sectional shape in the conveying direction, and comprises the progressively wider portion 210 downstream in the conveying direction. The conduit hole 140 has such a cross-sectional shape that it has a minimum width site in its intermediate portion in the conveying direction, and the minimum width Wa of this minimum width site is maintained larger than the width Wc-1 of the upstream end in the conveying direction of the progressively wider portion 210 in the cross-section of the extruded plastic material 208 and smaller than the width Wc-2 of its downstream end in the conveying direction. Accordingly, as can be seen by reference to FIG. 14 taken in conjunction with FIGS. 8 and 12, the extruded plastic material 208 is received easily and accurately in the plastic receiving portion 150 without bulging out. Furthermore, the plastic material 208 which has once been received in the plastic receiving portion 150 is accurately held there without dropping by the holding action of the minimum width site in the intermediate portion of the plastic receiving portion 150.

Container Closure Body Feed Zone

With reference to FIG. 1, the container closure body feed means 6 disposed in relation to the container closure body feed zone 18 includes a rotating disc 212 mounted for free rotation about a central axis extending substantially vertically. A plurality of circumferentially and equidistantly spaced container closure body receiving depressions (not shown) are formed on the peripheral surface of the rotating disc 212. The rotating disc 212 is rotated in the direction shown by an arrow 214 in synchronism with the rotation of the rotatably supporting member 10 of the main body 2 of the compression molding apparatus. While the rotating disc 212 is rotated in the direction of the arrow 214, container closure bodies 24 are fed into the receiving depressions on the rotating disc 212 from a feed chute 218 in a receiving zone shown by reference numeral 216. By the rotation of the rotating disc 212, the container closure bodies 24 are conveyed to the container closure body feed zone 18. During this time, the container closure bodies 24 are prevented from dropping radially outwardly from the receiving depressions by a stationary guide 220 existing arcuately along the periphery of the rotating disc 212 from the receiving zone 216 to the container closure body feed zone 18.

In the container closure body feed zone 18, the container closure bodies 24 are transferred to the molds 12 in the main body 2 of the compression molding apparatus from the receiving depressions of the rotating disc 212. With reference to FIG. 15, in the upstream side of the container closure body feed zone 18, the downstream end portion of the stationary guide 220 is decreased in its vertical size and is advanced into the deep part of the groove 70 formed in the first mold portion 58 of the mold 12 in the main body 2 of the compression molding apparatus. On the other hand, the stationary guide 76 in the main body 2 of the compression molding apparatus extends towards the discharge zone 22 from the downstream side of the container closure body feed zone 18 (see FIG. 1 also). In the container closure body feed zone 18, each receiving depression of the rotating disc 212 is positioned opposite to each circular depression 72 formed in the first mold portion 58, and the container closure body 24 is positioned astride the receiving depression and the circular depression 72. Specifically, the top panel-side half portion of the container closure body 24 is received in the receiving depression, and the other half portion including the free end of the skirt wall, in the circular depression 72. In the downstream side of the container closure body feed zone 18, the container closure body 24 is permitted to move outwardly from the receiving depression, but prevented from moving outwardly from the circular depression 72 by the stationary guide 76. As a result, the container closure body 24 is transferred from the receiving depression to the circular depression 72, and received in the circular depression 72 and moved together with the first mold portion 58.

The container closure body feed means 6 itself may be of substantially the same type as that disclosed in Japanese Laid-Open Patent Publications Nos. 191532/1984 and 191533/1984, and therefore these patent documents are cited herein in view of describing the structure of the container closure body feed means 6 in detail.

Compression Molding Zone

With reference to FIGS. 16 and 17 in conjunction with FIGS. 1 and 5, when the molds 12 in the main body 2 of the compression molding apparatus pass through the compression molding zone 20, the main elevator members 90 and the subsidiary elevator means 92 are properly lowered. In the state shown in FIG. 16, the second mold portion 60 is lowered by the lowering of the main elevator member 90, and the under surface of the second mold portion 60 is intimately in contact with the upper surface of the first mold portion 58, and by the cooperation of the first molding depressed portion 74 of the first mold portion 58 and the second molding depressed portion 138 of the second mold portion 60, a ring-like mold cavity is defined. In the state shown in FIG. 16, the lower end of the main rod portion 186 of the compression rod 174 is positioned above the plastic receiving portion 150 (already containing the plastic material 208 received therein) in the conduit hole 140. The subsidiary elevator means 92 continues to be lowered, and the compression rod 174 is lowered to the position shown in FIG. 17. At this time, the main rod portion 186 of the compression rod 174 acts on the plastic material 208 present in the plastic receiving portion 150 and compresses the plastic material 208 forcedly onto the mold cavity. As a result, the plastic material 208 is molded into a shape corresponding to the mold cavity, i.e., the grip ring 38 of the form shown in FIG. 3-A. At the same time, the base portion 40 of the molded grip ring 38 surrounds the linking protruding piece 30 and the grip ring 38 is linked to the linking protruding piece 30 since the linking protruding piece 30 of the container closure body 24 projects into the mold cavity.

It is known in the art that it is extremely difficult, if not impossible, to adjust the amount of the plastic material 208 to be fed to the plastic receiving portion 150 exactly at a predetermined value, and some error exists in the amount of the plastic material 208. In the illustrated embodiment, the amount of the plastic material 208 fed is set at a slightly excessive amount, and the excess is compensated for by some elevation of the compression rod 174 against the elastic biasing action of the plate springs 182 at the end of the compression molding.

Discharge Zone

Figure 19:
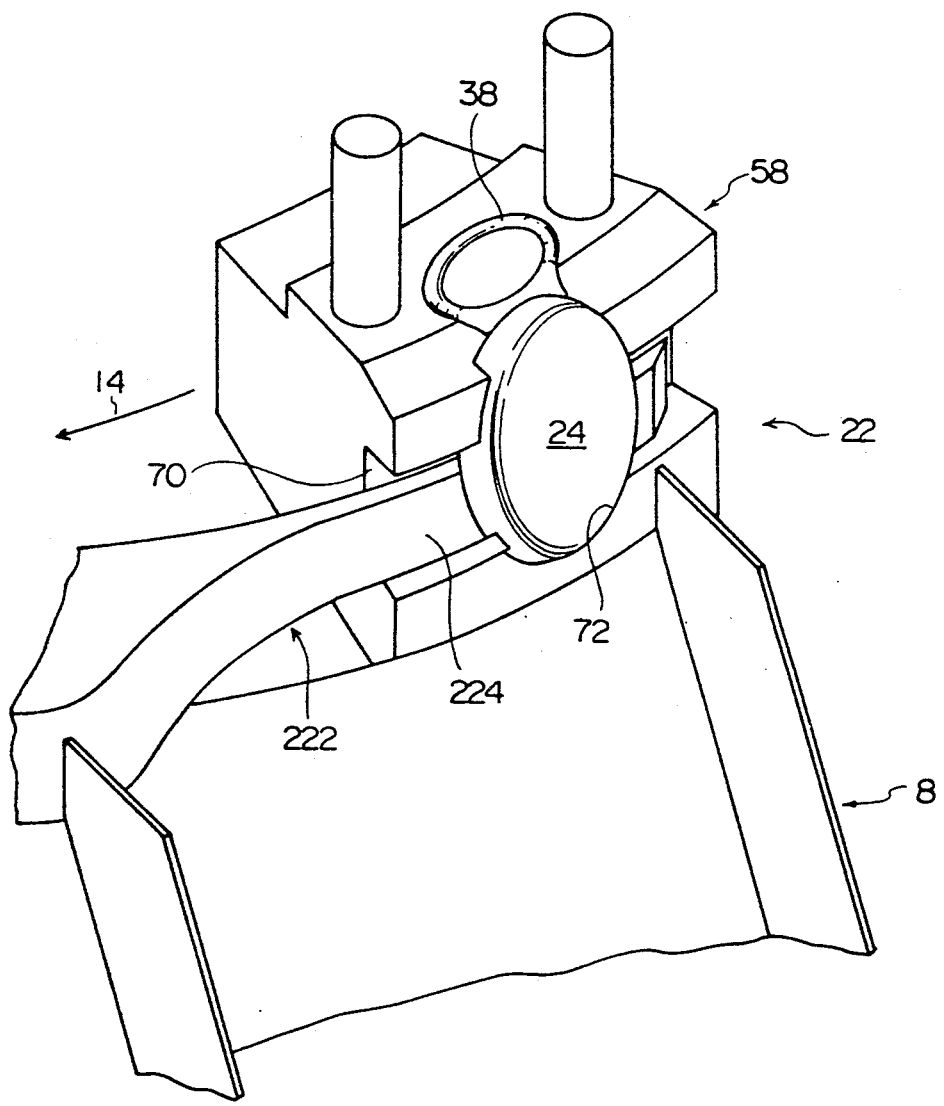

With reference to FIG. 18 taken in conjunction with FIG. 1, when the mold 12 is moved from the compression molding zone 20 to the discharge zone 22, the main elevator member 90 and the subsidiary elevator means 92 (FIG. 5) are elevated, and the second mold portion 60 and the compression rod 174 are elevated to the position shown in FIG. 18. As a result, the mold cavity is opened. In the discharge zone 22, a container closure having the container closure body 24 and the grip ring 38 is discharged from the mold 12 into the discharge chute 8. With reference to FIG. 19 as well as FIG. 18, the stationary guide rail 76 for preventing the container closure 24 from dropping from the circular depression 72 of the first mold portion 58 terminates in the upstream side of the discharge zone 22. Accordingly, the container closure is permitted to move outwardly from the circular depression 72 of the first mold portion 58. In the illustrated embodiment, an air jet-type container closure discharge means 222 is further disposed in relation to the discharge zone 22. This discharge means 222 includes a stationary member 224 having a rail-like forward end portion which advances into the deep part of the groove 70 formed in the first mold portion 58 and is positioned inwardly of the container closure in the discharge zone 22. As shown in FIG. 18, that site of the forward end portion of the stationary member 224 which is positioned opposite to the container closure has formed therein one or more jet holes 226 opened to the container closure. The jet holes 226 are connected to a compressed air supply source (not shown) via an air passage (not shown) formed in the stationary member 224. Accordingly, the compressed air fed from the compressed air supply source is jetted from the jet holes 226 against the container closure positioned in the circular depression 72 of the first mold portion 58. As a result, the container closure is accurately discharged outwardly from the circular depression 72 of the first mold portion 58 and supplied to the discharge chute 8. Then the container closure is conveyed to a suitable place such as a collecting zone through the discharge chute.

While the present invention has been described in detail with regard to one specific example of the compression molding apparatus of the invention, it should be understood that the invention is not limited to this specific embodiment, and various changes and modifications are possible without departing from the scope of the present invention described and claimed herein.

We claim:

1. A compression molding apparatus comprising a rotatably mounted rotatable supporting member and a plurality of circumferentially spaced molds mounted on the rotatable supporting member, each of said molds being adapted to be conveyed successively through a plastic material feed zone, a compression molding zone and a discharge zone by the rotation of the rotatable supporting member in a rotating direction, and a plastic material feed means for feeding a plastic material in a heat-softened state to each of said molds being disposed in the plastic material feed zone; wherein each of said molds comprises a first mold portion and a second mold portion adapted to be opened and closed by being moved relative to each other in substantially opposite directions, the first mold portion and the second mold portion in cooperation with each other define a mold cavity, a conduit hole extending from the mold cavity is formed in the second mold portion, each of the molds comprises a compression rod inserted slidably in the conduit hole, and the conduit hole has a plastic receiving portion opened frontwardly in the rotating direction of the rotatable supporting member, and the plastic material feed means includes an extruder having an extrusion opening opposite to a passage for conveying the plastic receiving portion of the conduit hole by the rotation of the rotatable supporting member and is constructed such that the heat-softened plastic material extruded from the extrusion opening is received in the plastic receiving portion of the conduit hole conveyed by the rotation of the rotatable supporting member in a conveying direction and cut, and the extrusion opening of the extruder has a portion progressively wider downstream as viewed in the conveying direction.

2. The compression molding apparatus of claim 1 in which the conduit hole has a minimum width site in its intermediate portion in the conveying direction, and the minimum width site is prescribed at a value larger than the width of the upstream end in the conveying direction of that portion of the plastic material extruded from the extrusion opening which corresponds to the progessively wider portion of the extrusion opening, but smaller than the width of the downstream end in the conveying direction of said portion of the plastic material extruded from the extrusion opening.

3. The compression molding apparatus of claim 1 in which the rotating axis of the rotatable supporting member extends in a first direction, the first mold portion and the second mold portion in each of the molds are opened or closed by being moved relative to each other in a substantially opposite directions, and the conduit hole extends in substantially said first direction.

4. The compression molding apparatus of claim 1 in which a container closure body feed zone exists between the plastic material feed zone and the compression molding zone as viewed in the rotating direction of the rotatable supporting member, in the container closure body feed zone, a container closure body feed means is disposed for feeding a container closure body having a circular top panel, a cylindrical skirt wall extending downwardly from the perpheral edge of the circular top panel and a linking protruding piece protruding from part of the free end of the skirt wall to each of the molds; and a plastic grip ring is formed by compression molding and simultaneously linked integrally to the linking protruding piece.

5. The compression molding apparatus as described in claim 1, wherein a container closure body feed zone exists between the plastic material feed zone and the compression molding zone as viewed in the rotating direction.

* * * * *